United States Patent [19]
Stackman et al.

[11] 3,883,467
[45] May 13, 1975

[54] SOLUTIONS OF TETRACHLORINATED AROMATIC POLYESTERS IN METHYLENE CHLORIDE

[75] Inventors: Robert W. Stackman, Morris Twp.; Clifford M. Vogt, Madison, both of N.J.

[73] Assignee: Celanese Corporation, New York, N.Y.

[22] Filed: July 1, 1974

[21] Appl. No.: 485,011

Related U.S. Application Data

[62] Division of Ser. No. 281,585, Aug. 17, 1972.

[52] U.S. Cl............ 260/33.8 R; 260/47 C; 260/61; 264/204; 264/205
[51] Int. Cl.................. C08g 51/30; D01f 7/00
[58] Field of Search.............. 260/33.8 R, 47 C, 61

[56] References Cited
UNITED STATES PATENTS
3,234,167  2/1966  Sweeny.......................... 260/30.4 R FOREIGN PATENTS OR APPLICATIONS
242,803  12/1960  Australia........................... 260/47 C
924,607  4/1963  United Kingdom............... 260/47 C

*Primary Examiner*—Melvyn I. Marquis
*Assistant Examiner*—H. H. Fletcher

[57] ABSTRACT

A stable solution adapted to form filaments by dry-spinning and a dry-spinning process utilizing such a stable solution are disclosed. The stable solution contains from about 70 to about 82 percent by weight of methylene chloride and about 30 to about 18 percent by weight of the solution of a polymer of the recurring structural formula:

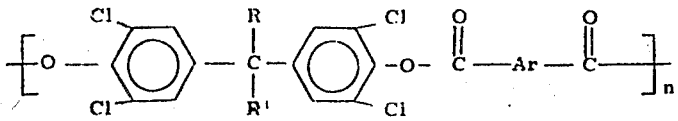

wherein
R and R' may be the same or different and represent lower alkyl groups or hydrogen or may, together, constitute a cyclic hydrocarbon group; and Ar is a mixture of from about 20 to about 40 percent paraphenylene and from about 80 to about 60 percent metaphenylene. The solution is stable for at least 24 hours between its formation and time of spinning and may be dry-spun into filaments at relatively low temperatures.

9 Claims, No Drawings

SOLUTIONS OF TETRACHLORINATED AROMATIC POLYESTERS IN METHYLENE CHLORIDE

This is a division, of application Ser. No. 281,585, filed Aug. 17, 1972.

BACKGROUND OF THE INVENTION

Dry-spinning of polymeric materials (i.e., spinning of a solution of the polymer into an atmosphere evaporative for the solvent) is a well-known method for forming shaped articles such as filaments of the polymeric material. It is especially advantageous to use a relatively low boiling point (e.g., less than about 50°C.) solvent so that solvent removal may be accomplished at relatively low temperatures. The use of high temperatures in the dry-spinning process may detrimentally affect the physical properties of the resulting filaments since voids may be formed in the filament by the rapid release of solvent.

Methylene chloride is an available, relatively low cost, low boiling point solvent. It has been found, however, that many methylene chloride-polymer solutions are not stable for sufficient periods of time to allow use of these solutions in commercial dry-spinning processes.

In a typical commercial dry-spinning operation, the polymer solution is prepared some time prior to actual spinning. In this manner, an adequate supply of polymer solution for the purpose of keeping the extrusion equipment operating at full capcity may be insured. Under these circumstances, the polymer solution is often prepared at least 1 to 3 days prior to extrusion. Moreover, the polymer solution occasionally must be stored for periods of 4 days or longer, depending upon the operation of the other extrusion equipment. Thus, these relatively long storage periods may be necessary when extrusion units (e.g., spinning metiers) are shut down for purposes of cleaning or repair.

It has been found that many methylene chloride solutions of polymers, and particularly methylene chloride solutions of aromatic polyesters, are unsuitable for dry-spinning into filaments since the solutions cannot be held for even up to 24 hours without a "phasing-out" phenomenon occuring, i.e., a separation of the solution into two phases containing larger and smaller concentrations of polymer. A phased-out solution is completely unsuitable for dry-spinning into filaments and interferes with the routine storage of the polymer solution in a dry-spinning plant. While the phased-out solution can generally be transformed into a homogeneous solution by means of additional mixing procedures, the latter results in additional expense and inconvenience.

Tetrachlorinated aromatic polyesters formed by the reaction of a tetrachlorinated bisphenol such as 4,4'-isopropylidene bis (2,6-dichlorophenol) and an aromatic diacid such as isophthalic or terephthalic acid or mixtures of isophthalic and terephthalic acids are known aromatic polyesters having good heat and light stability properties. See, for example, U.S. Pat. No. 3,234,167. As disclosed therein, however, these polymers are dissolved in relatively high-boiling point solvents such as tetrahydrofuran, chloroform, cyclohexanone, N,N-dimethylacetamide and a mixture of 70 percent 1,1,2-trichloroethane and 30 percent trifluoroacetic acid (all having boiling points above 60°C.) for spinning into filaments or the like. A dry-spinning process utilizing one of these solutions would thus have to be performed using relatively high temperatures to remove the solvent.

Methylene chloride solutions of aromatic polyesters including chlorinated aromatic polyesters are shown in Australian Pat. No. 242,803 and British Pat. No. 924,607. In these references, however, the concentration of polymer is low, i.e., about ten weight percent or less of the solution. These low concentration solutions, while suitable for casting into films, are unsuitable for dry-spinning into filaments. Dry-spinning solutions generally require from about 18 up to about 30 weight percent of polymer in solution in order to form coherent, homogeneous filaments at a commercially acceptable production rate. However, it has been found that many methylene chloride solutions of from about 18 up to about 30 weight percent tetrachlorinated aromatic polyesters do not possess the necessary solution stability over an extended period of time sufficient to allow their use in commercial dry-spinning processes.

The search has continued for a suitable methylene chloride solution of a tetrachlorinated aromatic polyester which can be used to form filaments in a commercially acceptable manner by a dry-spinning process.

It is an object of this invention to provide a stable solution of a tetrachlorinated aromatic polyester suitable for use in a dry-spinning process.

It is also an object of this invention to provide a solution of a tetrachlorinated aromatic polyester which remains stable without phasing out of the polyester for at least 24 hours.

It is further an object of this invention to provide an improved dry-spinning process for forming filaments of a tetrachlorinated aromatic polyester utilizing a stable solution of the polyester in methylene chloride.

SUMMARY OF THE INVENTION

These and other objects of the invention are provided in one aspect by a stable solution adapted to form filaments by dry-spinning which solution comprises from about 70 to about 82 percent by weight of the solution of methylene chloride and from about 30 to about 18 percent by weight of the solution of a polymer having a recurring structural formula:

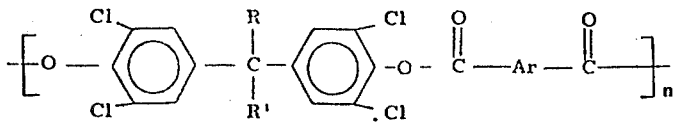

wherein n is so chosen that the molecular weight of the polymer is from about 10,000 up to about 200,000; R and R' may be the same or different and represent lower alkyl groups (i.e., having 1 to 6, preferably 1 to 3, carbon atoms) or hydrogen or may, together, constitute a cyclic hydrocarbon group; and Ar is a mixture of from about 20 to about 40 percent paraphenylene and from about 80 to about 60 percent metaphenylene; the stable solution having a viscosity of from about 100 to about 3,000 poises.

In another embodiment, these and other objects of the invention are achieved by a dry-spinning process for forming filaments which comprises extruding the above-defined stable solution through an opening into an evaporative atmosphere for the methylene chloride to form the filament.

DETAILED DESCRIPTION OF THE PREFERRED EMBODIMENTS

The aromatic polyesters useful in the present invention may be prepared by any suitable technique, such as interfacial polymerization or solution polymerization, under controlled conditions of condensation known in the art. Suitable methods for the manufacture of aromatic polyesters such as utilized in the present invention, are shown, for example, in U.S. Pat. No. 3,234,167, Australian Pat. No. 242,803 and British Pat. No. 924,607 noted above.

A suitable method for preparing the aromatic polyester includes reacting an appropriate tetrachlorinated bisphenol such as the preferred 4,4'-isopropylidene bis (2,6-dichlorophenol) (commonly known as "tetrachlorobisphenol A") with a mixture of from about 20 to about 40 percent, preferably from about 25 to about 35, most preferably about 30, percent by weight of terephthalic acid, and from about 80 to about 60, preferably from about 75 to about 65, most preferably about 70 percent by weight of isophthalic acid in a common solvent. Often the terephthalic and isophthalic acids are reacted in the form of the acid dihalides and the reaction is carried out in the presence of a suitable acid acceptor such as a tertiary amine to combine with the hydrogen chloride evolved during the reaction. Advantageously, the solvent is methylene chloride.

The resulting aromatic polyester may be precipitated by the addition of excess methanol or water, filtered and dried. Preparation of the solutions of the present invention adapted to form fibers by dry-spinning may be accomplished by dissolving the aromatic polyester in sufficient methylene chloride to yield a stable solution comprising from about 70 to about 82, preferably from about 75 to about 80, most preferably from about 76 to about 78, weight percent of the solution of methylene chloride and from about 30 to about 18, preferably from about 25 to about 20, most preferably from about 24 to about 22, percent by weight of the polymer.

The stable solution may have a viscosity (as measured on a Brookfield Viscosimeter) suitable for dry-spinning into fibers, which may be from about 100 to about 3,000, preferably from about 600 to about 2100, and most preferably from about 1200 to about 1800, poises. The inherent viscosity (I.V.) of the solution as measured in a solution of a mixture of phenol and tetrachloroethane is from about 0.4 to about 2.0 or higher, preferably from about 0.5 to 1.5.

The solution of the present invention is stable and will remain stable, i.e., without substantial phasing-out or separation of the solution into two phases containing larger and smaller concentrations of polymer, at a temperature of from 25° to 100°C. for a period of at least 24 hours, generally for at least 40 hours and often for more than 100 hours.

The stable solution may be dry-spun into an evaporative atmosphere for the methylene chloride solvent to form filaments. The stable solution can, for example, be extruded into an atmosphere of heated air. It is preferred that no steam or other moisture be present in the evaporative atmosphere.

Spinning of the stable solution may be performed using any suitable dry-spinning apparatus. Both downdraft and updraft spinning columns may be used under either heated or cool column conditions. A typical spinning column can be about 6 inches in diameter and 6 or 12 feet long.

The stable solution may be spun through an opening into the spinning column. Often, the spinneret may be provided with a jet having multiple openings (e.g., up to about 40 holes or more) although a single opening may be satisfactory. Each opening is generally of the same size and often is in the range of from about 30 to about 60 microns. Typical spinneret jet openings, for example, may be 32, 36, 42 or 56 microns.

Temperatures in the spinneret may range, for example, at the jet face of from about 30° to about 85°C., near the top of the column of from about 30° to about 82°C. and near the bottom of the column of 30° to about 75°C.

The filament produced in the spinneret may have a denier generally in the range of from about 3 to about 9, preferably from about 4 to about 8, denier per filament (dpf). The as-spun filaments are often drawn two to three times in length (to about one-half of original dpf after drawing), with, for example a drawing ratio of from about 2:1 to about 2.5:1 or more (e.g., up to about 8:1) over a heated shoe at a temperature of from about 250° to 300°C. in accordance with known techniques.

The resulting aromatic polyester filamentary materials have substantial heat stability and light stability and are suitable for use in clothing.

The invention is additionally illustrated in connection with the following Examples which are to be considered as illustrative of the present invention. It should be understood, however, that the invention is not limited to the specific details of the Examples.

Example I

A series of polyesters of tetrachlorobisphenol A and mixtures of isophthalic and terephthalic acids were prepared. Each polyester was made by slowly adding one mole of the isophthalic/terephthalic acid mixture (in the form of a methylene chloride solution of the isophthalic acid/terephthalic acid dihalides) to a methylene chloride solution containing one mole of the tetrachlorobisphenol A. The tetrachlorobisphenol A solution also contained two moles of triethylamine to react with the HCl formed during the reaction. Methylene chloride was present in a total amount sufficient to yield a resulting solution of about ten weight percent of polymer.

The resulting solution was refluxed for 2 hours, washed three times with a three percent HCl solution to remove triethylaminehydrochloride and then washed 3 times with water. Excess methanol was added to the washed solution to precipitate the polymer which was removed by filtration and dried.

Each resulting dried polyester was dissolved in methylene chloride in amounts of 10, 20, 24 and 30 percent by weight of the solution and the resulting solutions were held until a substantial phasing-out was observed. The polymer composition and results obtained are shown below in Table I.

TABLE I

| Isophthalic Acid/ Terephthalic Acid Ratio | I.V. | Methylene Chloride Solution Stability (Hours to Phase Out) | | | |
|---|---|---|---|---|---|
| | | 10% | 20% | 25% | 30% |
| 10/0 | 0.87 | <24 | 0 | — | — |
| 9/1 | 0.45 | 48 | 24 | <24 | <24 |
| 8/2 | 0.46 | 48 | 24 | 24 | 24 |
| 7/3 | 0.62 | >100 | >100 | >100 | >100 |
| 6/4 | 0.43 | 48 | <48 | 48 | 24 |
| 5/5 | 0.25 | 48 | >24 | 24 | <24 |
| 4/6 | 0.42 | 48 | <24 | <24 | <24 |
| 3/7 | 0.42 | 48 | <24 | 0 | 0 |
| 2/8 | 0.54 | <24 | <24 | — | — |
| 1/9 | Insol. | <24 | <24 | — | — |
| 0/10 | 0.90 | 0 | 0 | — | — |

Example II

A polyester of tetrachlorobisphenol A and a mixture of isophthalic and terephthalic acids (70/30 weight ratio of isophthalic/terephthalic acid) was formed in the same manner as the polyesters of Example I.

The polyester was dissolved in methylene chloride and dry-spun into filaments under varying conditions which are shown below in Table II.

Table II

| Run No. | 1 | 2 | 3 | 4 | 5 |
|---|---|---|---|---|---|
| Dope Solids, % by weight | 22.2 | 22.2 | 25.0 | 30 | 24 |
| Dope Viscosity, Poise | 1280 | 1280 | 600 | 240 | 180 |
| Jet (No. of Holes/hole size $\mu$) | 40/42 | 20/42 | 15/42 | 10/42 | 20/42 |
| Jet Face Temperature, °C. | 68 | 80 | 32 | 43 | 57 |
| Column Temperature, °C. Top | 59 | 54 | 37 | 45 | 50 |
| Column Temperature, °C. Bottom | 63 | 64 | 46 | 37 | 67 |
| Take-Up Speed meters/ min. | 120 | 200 | 50 | 50 | 300 |
| Column Length, feet | 12 | 12 | 6 | 6 | 12 |
| Column Air | Up-Draft | Down-Draft | Down-Draft | Down-Draft | Up-Draft |

The resulting filaments all are essentially void-free and have good physical properties. As-spun tenacity values are in the range of about 0.9 to 1.2 grams per denier with elongation values from about 95 to 130 percent. The filaments may be satisfactorily drawn in accordance with known polyester drawing techniques including drawing over a hot shoe at about 275°C. and a drawing ratio of about 2.5:1. As-shown tenacity values are in the range of about 1.8 to 3.5 grams per denier with elongation values of about 11 to 50 percent.

What is claimed is:

1. A stable solution adapted to form fibers by dry-spinning which solution comprises:
   from about 70 to about 82 percent by weight of the solution of methylene chloride; and
   from about 30 to about 18 percent by weight of the solution of a polymer having a recurring structural formula:

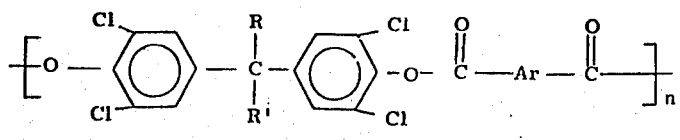

wherein
n is so chosen that the molecular weight of the polymer is from about 10,000 up to about 200,000 and R and R' may be the same or different and represent lower alkyl groups or hydrogen or may, together, constitute a cyclic hydrocarbon; and Ar is a mixture of from about 20 to about 40 percent paraphenylene and from about 80 to about 60 percent metaphenylene; the stable solution having a viscosity of from about 100 to about 3,000 poises.

2. The stable solution of claim 1 wherein R and R' are each a methyl group.

3. The stable solution of claim 1 wherein said solution contains from about 75 to about 80 percent by weight of the methylene chloride and from about 25 to about 20 percent by weight of the polymer.

4. The stable solution of claim 2 wherein said solution contains about 76 to about 78 percent by weight of methylene chloride and about 24 to about 22 percent by weight of the polymer.

5. The stable solution of claim 3 wherein Ar is a mixture of from about 25 to about 35 percent by weight of paraphenylene and from about 75 to about 65 percent by weight of metaphenylene.

6. The stable solution of claim 4 wherein Ar is a mixture of about 30 percent by weight of paraphenylene and about 70 percent by weight of metaphenylene.

7. The stable solution of claim 5 wherein the solution has a viscosity of from about 600 to about 2,100 poises.

8. The stable solution of claim 7 wherein the solution has a viscosity of from about 1,200 to about 1,800 poises.

9. The stable solution of claim 1 wherein the solution contains from about 76 to 78 percent by weight of methylene chloride and about 24 to about 22 percent by weight of the said polymer in which R and R' are each a methyl group, Ar is a mixture of about 30 percent by weight of paraphenylene and about 70 percent by weight of metaphenylene, said solution having a viscosity of about 1,200 to about 1,800 poises.

* * * * *